United States Patent [19]

Goebel et al.

[11] 4,170,008

[45] Oct. 2, 1979

[54] CLUTTER DISCRIMINATING FUZE APPARATUS

[75] Inventors: Robert H. Goebel, Bridgeton; Dale A. Fogle, St. Louis Township, St. Louis County, both of Mo.

[73] Assignee: The United States of America as represented by the Secretary of the Air Force, Washington, D.C.

[21] Appl. No.: 553,360

[22] Filed: Feb. 28, 1975

[51] Int. Cl.² ........................... F42C 13/04; G01S 9/37
[52] U.S. Cl. .................................. 343/7 PF; 102/214
[58] Field of Search ....................... 343/7 PF; 102/214

[56] References Cited

U.S. PATENT DOCUMENTS

| | | | |
|---|---|---|---|
| 3,332,077 | 7/1967 | Nard et al. | 343/7 PF |
| 3,821,737 | 6/1974 | Kalmus | 343/7 PF |
| 3,858,207 | 12/1974 | Macomber et al. | 343/7 PF |
| 3,906,493 | 9/1975 | Adrian et al. | 343/7 PF |

Primary Examiner—Malcolm F. Hubler
Attorney, Agent, or Firm—Joseph E. Rusz; William Stepanishen

[57] ABSTRACT

A clutter discriminating fuze apparatus for preventing prefires and duds which may result through the use of electronic countermeasure techniques by the enemy.

5 Claims, 1 Drawing Figure

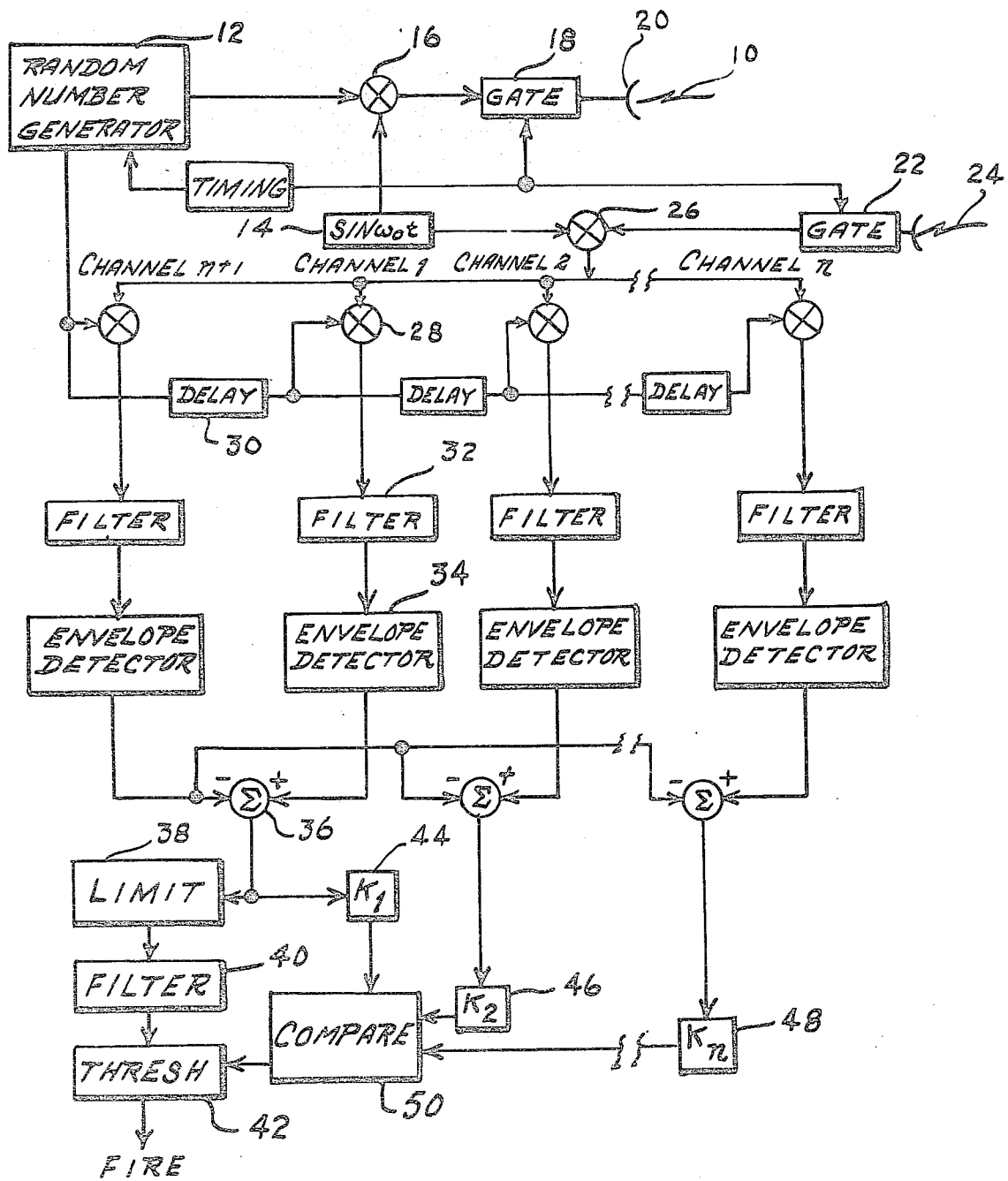

CLUTTER DISCRIMINATING FUZE APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to fuzing devices and in particular to a clutter discriminating fuze apparatus.

In general, a fuze is a mechanism for igniting or detonating the bursting charge of a projectile, and it performs this function either upon impact or at a certain time during flight. When designed to function on impact it is classed as an impact or percussion fuze, and when designed to function at some predetermined time after the projectile leaves the gun it is classed as a time fuze. A combination fuze combines both time and percussion elements. These are normally set for time action but will function on impact should the time element fail or should impact occur before the time element causes functioning. Classed according to the assembled position in the projectile, there are point fuzes, which are assembled into the nose of shell, and base fuzes, which are assembled into the base.

With the advent of electronics into modern warfare, fuzing has become quite sophisticated and in turn so has the electronic counter measures which are utilized in defense thereof. The present invention is quite versatile in that it has the capability to discriminate against both active and passive electronic countermeasure techniques.

SUMMARY

The present invention is a clutter discrimination fuze apparatus which utilizes multiple range gates to prevent prefires and duds which may be caused by passive electronic countermeasures such as chaff cloud. The clutter discriminating fuse apparatus has the capability of discriminating against active electronic countermeasure techniques through the employment of continuous wave spread spectrum modulation.

It is one object of the invention, therefore, to provide an improved clutter discrimination fuze apparatus having the capability to prevent prefires and duds which are caused by chaff clouds.

It is another object of the ivention to provide an improved clutter discrimination fuze apparatus which may discriminate against both active and passive electronic countermeasure techniques.

It is yet another object of the invention to provide an improved clutter discrimination fuze apparatus which has the capability of being set to detonate a warhead at a precise predetermined altitude.

These and other advantages, features and objects of the invention will become more apparent from the following description taken in connection with the illustrative embodiment in the accompanying drawings wherein there is shown a block diagram of the clutter discriminating fuse apparatus utilizing a bi-phase coded system.

DESCRIPTION OF THE PREFERRED EMBODIMENT

Turning now to the FIGURE, there is shown a clutter discriminating fuze aparatus which has the capability of discriminating against both active and passive electronic countermeasures techniques. Since the present invention can function properly through electronic defensive measure, prefires and duds which are a result of such measures can be prevented. The clutter discriminating fuze apparatus utilizes a multiple range gate implementation of a bi-phase coded fuze which may include intermittent CW operation and range-gate discrimination.

The transmitted waveform 10 is generated by multiplying the random number generator 12 output, a random $\pm 1$ sequence by a sine wave to obtain the standard bi-phase coded waveform. This sine wave is generated in sine wave generating unit 14 and applied to multiplier 16. This waveform is then gated by gate 18 before being transmitted by antenna 20. The gates 18, 22 which are shown in both transmitter and receiver paths are operated out of phase of eliminate the feed-through problem. When the transmitter gate 18 is opened the receiver gate 22 is closed and vice versa. The received waveform 24 is first multiplied in multiplier 26 by the unmodulated transmitted sine wave from unit 14. The resultant waveform is then multiplied respectively by a delayed version of the random sequence in each of the n gate channels. Channel 1 which is representative of the n gate channels in the present invention is comprised of a multiplier 28, an associated delay unit 30, a filter 32 and an envelope detector 34. The time delay which is associated with each of these n channels is equal to the round-trip time delay associated with the range of the gate centers. The n+1 channel shown in the Figure is the noise channel in which the return signal is multiplied by a nondelayed version of the random code from generator 12. Each of the n+1 channels contain bandpass filters such as filter 32 which are centered on the doppler frequency return. Following envelope detection in each channel the noise channel is subtracted in the respective summing units (summing unit 36 being representative of summing units in the plurality of channels) from each of the n signal gate channels. This subtraction cancels the mean of the noise voltage and facilitates setting the output threshold. The firing signal is determined by utilizing respectively limit unit 38, filter 40 and threshold unit 42 to limit, filter, and threshold the 3000 foot signal gate. Channel 1 in the present example is the 3000 foot signal. The n gate outputs are also weighted and compared for use as a chaff discriminant. This is accomplished by applying the outputs from the respective n channel summing units to coefficient units 44, 46, 48 respectively. These weighted outputs are then compared in comparison unit 50 and applied to threshold unit 42. The fuse firing is initiated when both the 3000 foot gate and the weighted sums of all n gates exceed a threshold.

It may be seen that the clutter discriminating fuze apparatus is a novel fuze that utilizes multiple range gates to prevent prefires and duds caused by chaff clouds, while discriminating against active countermeasures by employing continuous wave spread spectrum modulation. In addition to its primary use as a fuze to donate a warhead at the appropriate altitude, the present fuze may be used as a secure altimeter.

Although the invention has been described with reference to a particular embodiment, it will be understood to those skilled in the art that the invention is capable of a variety of alternative embodiments within the spirit and scope of the appended claims.

What is claimed is:

1. A clutter discriminating fuze apparatus for discriminating against both active and passive electronic countermeasures comprising in combination:

control means for providing a control signal, means for generating and transmitting connected to said control means to receive said control signal, said generating and transmitting means providing a bi-phase coded signal in response to said control signal, said bi-phase coded signal being gated, means for receiving said bi-phase coded signal, said receiving means being connected to said control means to receive said control signal, said receiving means and said generating and transmitting means being gated mutually exclusive, a plurality of range gate channels respectively connected to said receiving means to receive said bi-phase coded signal, each of said plurality of range gate channels being respectively centered on a different predetermined doppler frequency, said plurality of range gate channels respectively detecting a return within its predetermined doppler frequency, said plurality of range gate channels providing a target level signal in response to detected returns, said target level signal comprising one or more target returns from said plurality of range gate channels, and a logical compare unit connected to said plurality of range gate channels to receive said channels target level signal, said target level signal being weighted and compared with a predetermined level standard, said logical compare unit providing a fire signal when said weighted target level signal exceeds said predetermined level standard.

2. A clutter discriminating fuze apparatus as described in claim 1 wherein said generating and transmitting means comprises in combination:

a signal generating means to provide a random number signal, a multiplier unit connected to said signal generating means to receive said random number signal, said multiplier unit receiving said control signal, said multiplier unit providing a said bi-phase coded signal, and a gated transmitter connected to said multiplier unit to receive said bi-phase coded signal, said control signal being applied to said gated transmitter to gate said gated transmitter on.

3. A clutter discriminating fuze apparatus as described in claim 1 wherein said receiving means comprises in combination:

a gated receiver to receive said bi-phase coded signal, said gated receiver receiving said control signal from said control means, said control signal turning said gated receiver on while turning said gated transmitter off, and a multiplier unit connected to said gated receiver to receive said bi-phase coded signal, said multiplier unit receiving said control signal and demodulating said bi-phase coded signal in response thereto, said multiplier unit providing on output, said output being a doppler spread frequency.

4. A clutter discriminating fuze apparatus as described in claim 1 wherein said control unit comprises in combination:

a timing unit to provide a timing signal, and a sine wave generator to provide a sine wave signal, said timing signal and said sinewave signal comprising said control signal.

5. A clutter discriminating fuze apparatus as described in claim 1 wherein said plurality of range gate channels utilize continuous wave spread spectrum modulation to detect targets at various distances.

* * * * *